(12) United States Patent
Verona

(10) Patent No.: US 6,302,258 B1
(45) Date of Patent: Oct. 16, 2001

(54) ALIGNING DEVICE FOR CONTAINERS OF VARIOUS SHAPES

(75) Inventor: Massimo Verona, Reggio Emilia (IT)

(73) Assignee: O.M.S.O. S.p.A., Reggio Emilia (IT)

( * ) Notice: Subject to any disclaimer, the term of this patent is extended or adjusted under 35 U.S.C. 154(b) by 0 days.

(21) Appl. No.: 09/399,940

(22) Filed: Sep. 20, 1999

(30) Foreign Application Priority Data

Oct. 21, 1998 (IT) ............................................. RE980051 U

(51) Int. Cl.[7] ................................................. B65G 47/24
(52) U.S. Cl. ......................... 198/392; 198/443; 198/396
(58) Field of Search .................... 198/392, 443, 198/836.3

(56) References Cited

U.S. PATENT DOCUMENTS

| | | | |
|---|---|---|---|
| 2,941,651 | * | 6/1960 | Hutter et al. ...................... 198/392 X |
| 3,185,187 | * | 5/1965 | Luther ........................... 198/363.3 X |
| 4,699,261 | | 10/1987 | Nesin .................................. 198/398 |
| 4,709,798 | * | 12/1987 | Herzog ............................. 198/392 X |
| 5,042,639 | * | 8/1991 | Guinn et al. ......................... 198/443 |
| 5,234,098 | * | 8/1993 | Pedersen ....................... 198/836.3 X |
| 5,299,675 | | 4/1994 | Schumann et al. .................. 198/392 |
| 5,443,149 | * | 8/1995 | Rohwetter et al. .................. 198/392 |
| 5,740,899 | * | 4/1998 | Pugh et al. ....................... 198/443 X |

\* cited by examiner

Primary Examiner—James R. Bidwell

(57) ABSTRACT

Machine for aligning objects, such as variously shaped cylindrical containers to be fed to printing machines, filling machines, labelling machines or the like, comprises a rotary disc shaped as a cone with its vertex facing upwards, an underlying flat circular concentric disc the periphery of which projects beyond the edge of the upper disc and which is rotated in the same direction as but at a different speed from the upper disc, a fixed first portion of rigid cylindrical wall bounding a sector of said upper disc, and a second portion of curved wall adjustable in the radial direction and connecting the first wall overlying the edge of the upper disc to a deformable third wall extending from said second wall to lie in front of and at an adjustable distance from at least a portion of said first wall, said third wall being a flexible wall constructed of synthetic material and being supported by a series of supports, the distance of which from the centre of the machine is adjustable in synchronism.

20 Claims, 3 Drawing Sheets

ALIGNING DEVICE FOR CONTAINERS OF VARIOUS SHAPES

BACKGROUND OF THE INVENTION

1. Field of the Invention

This patent relates to machines for creating an alignment of objects starting from a heap of loose objects.

In particular the patent concerns the alignment of cylindrical containers of circular, oval or polygonal base, such as plastic bottles, which are to be fed to printing machines, or to other types of machine such as filling machines, labelling machines or the like.

2. Description of the Background Art

Aligning machines are known comprising a rotating conical disc with its vertex facing upwards and rotating coaxially to an underlying adjacent flat circular disc the edge of which projects beyond the edge of the conical disc.

The two discs rotate at different speeds, so that the objects tend to position themselves on the edge of the lower disc with their axis horizontal, those objects lying on the outside resting laterally against a substantially cylindrical outer wall.

While in this configuration they are fed into a runway having a width just greater than the diameter of the object, and within which they lie aligned in a horizontal position, resting against the periphery of the flat lower disc.

Said runway is defined by the lower disc, the outer wall and an inner wall which accompanies said outer wall for a certain distance, but spaced therefrom.

The width of said runway has to be reset each time the object dimensions change, because if the runway is too narrow it prevents the objects entering it, whereas if it is too wide it enables the objects to lie not perfectly aligned, so preventing their advancement by jamming.

In known machines the outer wall of the runway is formed from rigid linear segments partly superposed on each other to create a polygonal wall portion, the average radius of curvature of which adapts to the dimensions of the objects.

The known solution suffers from drawbacks deriving firstly from the polygonal shape of the wall, which itself can hinder to a certain extent the free sliding of the objects.

Secondly, the mechanical complication of the known solution is immediately apparent, with particular reference to the means for adjusting the position of said wall.

SUMMARY OF THE INVENTION

The object of this patent is to provide an object aligning machine of the aforedefined type in which the outer wall bounding said runway can be easily adjusted in position within the framework of a simple, low-cost construction.

This object is attained by an aligning machine having the characteristics defined in the claims.

The constructional and operational characteristics of the invention will be more apparent from the ensuing description of a preferred but not exclusive embodiment thereof illustrated on the accompanying drawings.

DETAILED DESCRIPTION OF THE PREFERRED EMBODIMENT

Figure 1:
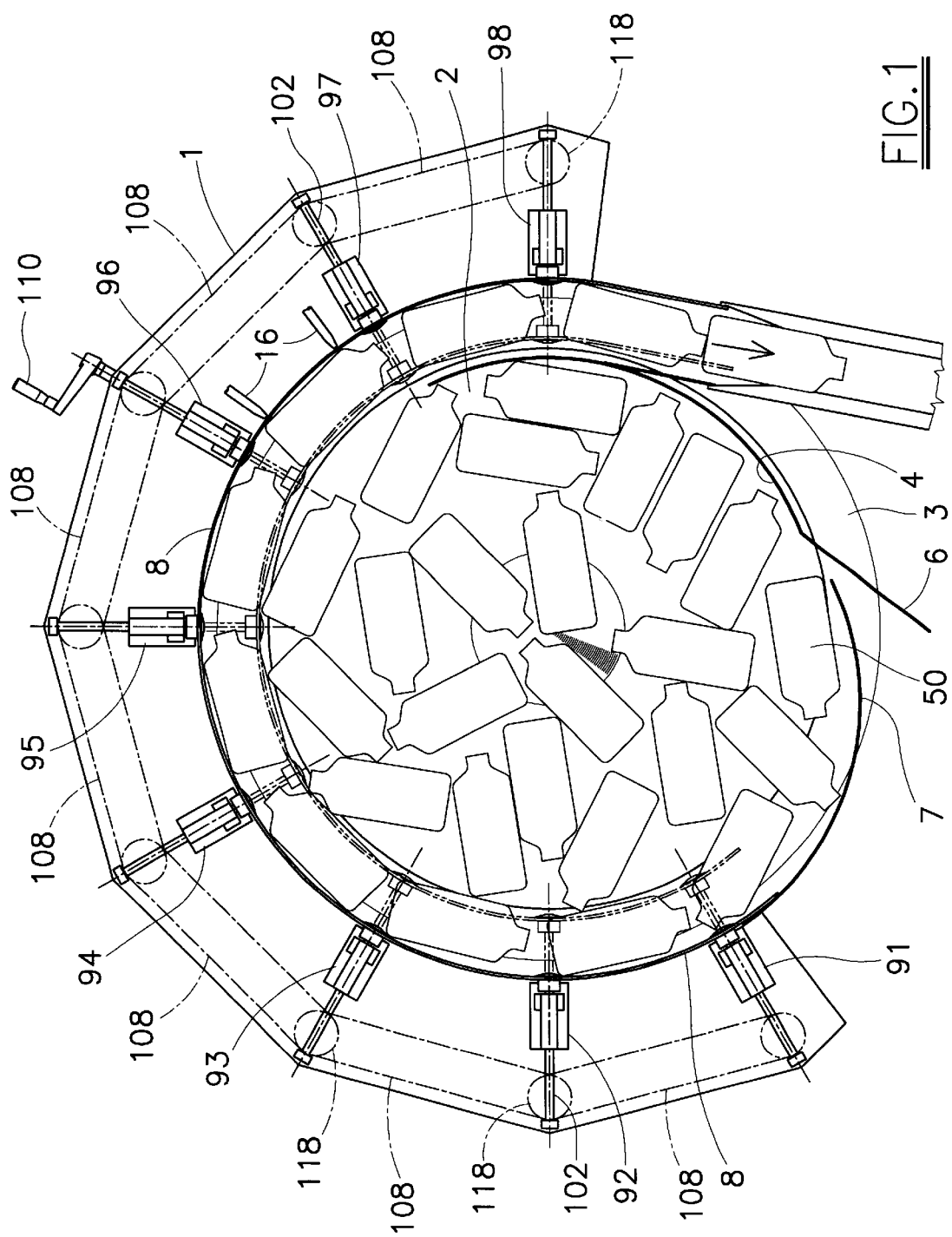
FIG. 1 is a schematic plan view of the invention.
Figure 2:
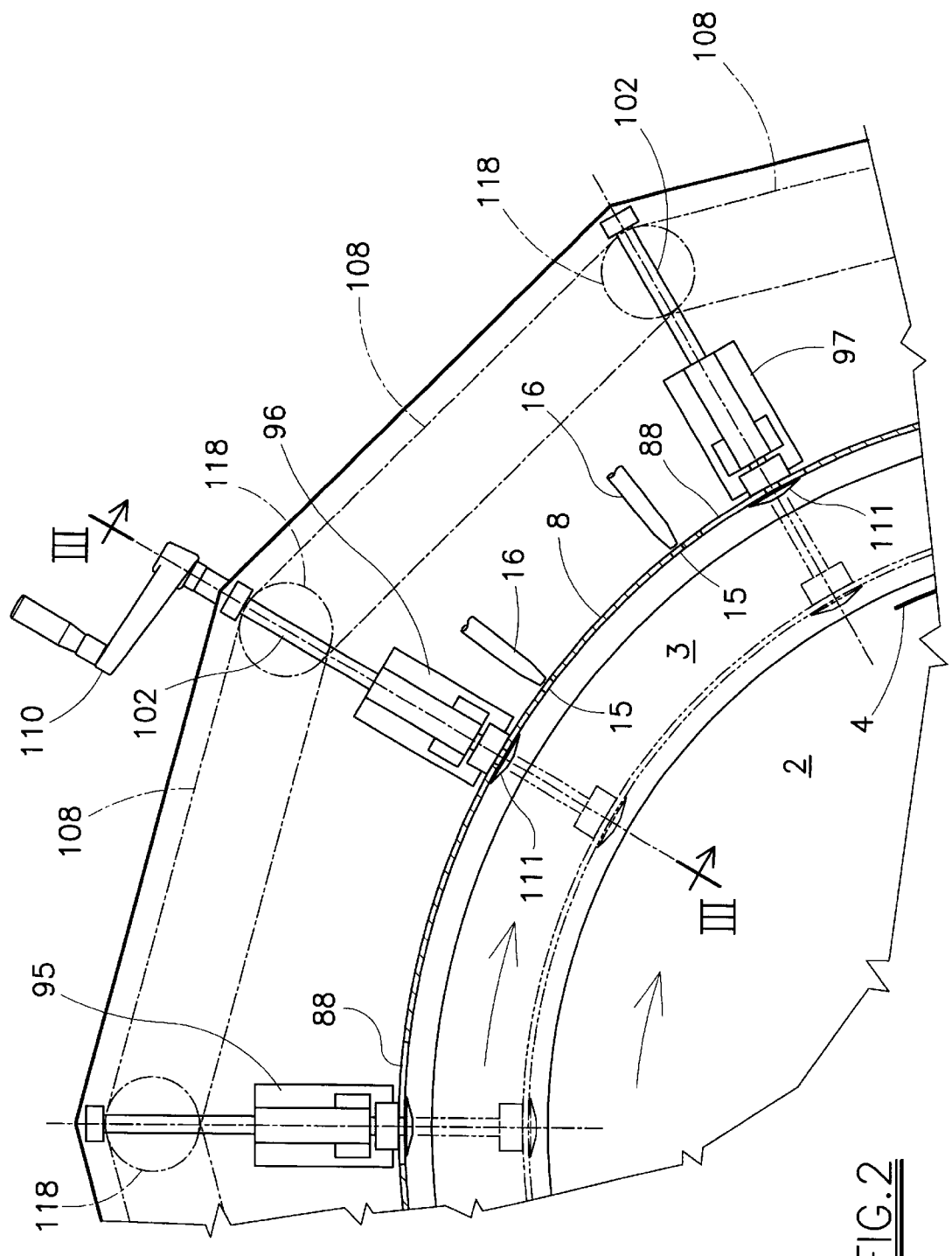
FIG. 2 is an enlarged detail of FIG. 1.

The figures show an aligning machine provided with a frame 1 which supports a central disc 2 of conical form with its vertex facing upwards, and rotating above a flat coaxial disc 3 rotating in the same direction but at a greater speed.

Along the periphery of the inner disc 2, onto which the containers 50 to be aligned are unloaded loose, there is positioned a fixed first circular wall 4 which at one end, namely the downstream end in the direction of its movement, comprises a straight portion 6 which extends outwards.

Continuing from said end there is provided a rigid second wall 7 with an outwardly widening profile and which can be moved radially while remaining substantially parallel to itself, as will be seen hereinafter.

The downstream end of said second wall 7 is connected to a third deformable elastic wall 8 of synthetic material, such as teflon or the like, having a length sufficient to enable it to face the wall 4, at a distance therefrom, along a substantial portion of this latter.

The wall 8 is supported by a series of eight equidistant supports 91 ... 98, each comprising a radially movable rod forming a sustaining and thrust point for the wall.

Figure 3:
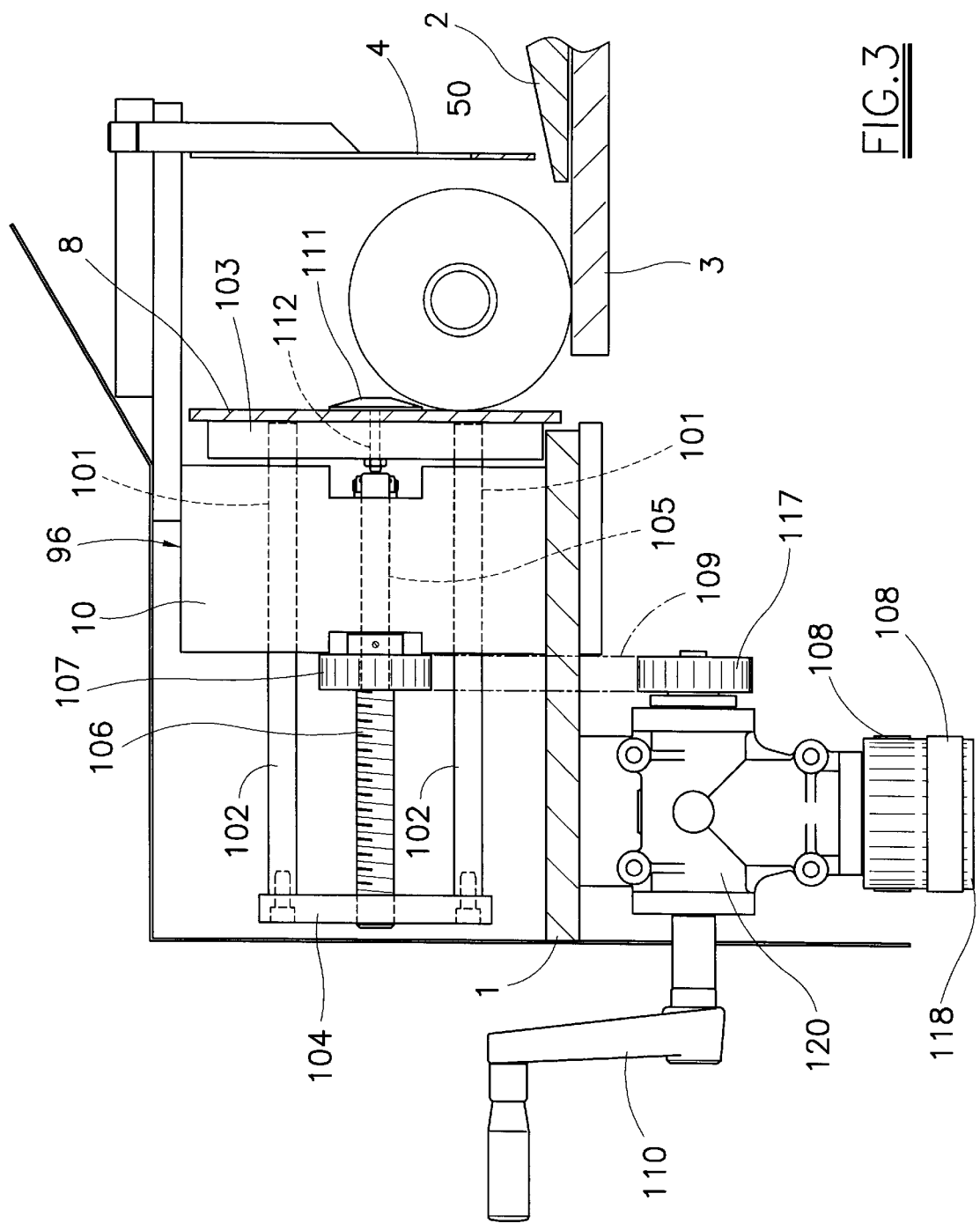
FIG. 3 is a section on the line III—III of FIG. 2.

Specifically, as can be seen in FIG. 3, the supports comprise a block 10 supported by the frame 1 and having two radial holes 101 through which there slide two rods 102 which at that end facing the centre of the machine support a plate 103 and at their opposite end support a crosspiece 104.

At the centre of the block 10 there is a further through hole 105 within which there rotates a rod 106 which at least along a certain portion is threaded externally to engage a threaded hole provided in the crosspiece 104.

On said rod 106 there is fixed a toothed pulley 107 which is connected by a toothed belt 109 to a further toothed pulley 117. This latter is mounted at one end of a horizontal shaft of a perpendicular gear transmission 120 fixed to each of the supports 91 ... 98, on the vertical shaft of which there is keyed a double toothed pulley 118.

All the double pulleys 118 are connected together by a toothed belt transmission 108 shown schematically in FIGS. 1 and 3.

The horizontal shaft of the perpendicular transmission carries at its other end a manual operating handle 110.

The plate 103 relative to the support 96 is rigidly fixed to the flexible elastic wall 8 by a bolt 111, the shank 112 of which passes through the wall and plate to receive a nut on the other side of the plate.

In contrast, the plates 103 relative to the other supports are slidingly connected to the flexible wall 8, with the shank of the bolt 111 inserted through a horizontal slot 88 provided in the wall 8.

The length of the slot 88 provided at each of said supports is progressively greater the greater the distance of the slotted support from the support 96, to enable the flexible wall to slide on changing its length.

The first support 91 in the direction of rotation of the discs 2 and 3 also supports said second wall 7.

By virtue of said arrangement the plates 103 and relative bolts 111 form that number of thrust points for the flexible elastic wall, their synchronous advancement and withdrawal movements obliging the wall to follow curvilinear paths at a desired constant distance from the first fixed inner wall 4 of the runway.

In this manner a variable-width runway is obtained, the width of which can be adjusted on the basis of the dimension of the objects to be aligned.

Finally, to ensure that only one container enters the evacuation runway each time, at some points of the wall 8 situated upstream of the initial portion of the fixed wall 4 there are provided vertical slots 15 through which nozzles 16 blow air jets against any misplaced containers.

For this purpose the position of the nozzles 16 can be adjusted on the basis of the dimensions of the container to be handled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A machine for aligning objects, such as variously shaped cylindrical containers to be fed to printing machines, filling machines, labelling machines, comprising a rotary disc shaped as a cone with its vertex facing upwards, an underlying flat circular concentric disc the periphery of which projects beyond the edge of the upper disc and which is rotated in the same direction as but at a different speed from the upper disc, a first circular wall comprising an outward extending straight portion and bounding a sector of said upper disc, and a second wall adjustable in the radial direction and connecting the outward extending straight portion of the first circular wall to a third deformable elastic wall extending from said second wall to lie in front of and at an adjustable distance from at least a portion of said first circular wall, in which said third wall is a flexible wall constructed of synthetic material and is supported by a series of supports, the distance of which from the center of the machine is adjustable in synchronism.

2. The machine as claimed in claim 1, wherein the lower disc rotates at a greater speed than the upper disc.

3. The machine as claimed in claim 1, wherein said flexible wall is made of teflon.

4. The machine as claimed in claim 1, wherein each of said supports comprises a radially movable rod, the end of which is engaged with said movable wall.

5. The machine as claimed in claim 4, wherein one of said supports has its rod rigidly fixed in a hole in said movable wall.

6. The machine as claimed in claim 5, wherein remaining supports have their rod slidable within a horizontal slot in said movable wall.

7. The machine as claimed in claim 5, wherein that support having its rod rigidly fixed in the hole in the movable wall is an intermediate support.

8. The machine as claimed in claim 4, wherein the first of said supports in the direction of rotation of the discs also supports said second wall.

9. The machine as claimed in claim 4, wherein each support comprises a block provided with a horizontal through hole within which said rod slides.

10. The machine as claimed in claim 9, wherein with each block there is associated a freely rotatable but axially locked toothed pulley, which is internally threaded to receive a threaded portion of said rod.

11. the machine as claimed in claim 10, wherein all the pulleys associated with the blocks are connected together by a transmission which causes them to rotate in synchronism.

12. the machine as claimed in claim 10, wherein one pulley is connected to an operating handle via a mechanical transmission.

13. An apparatus for aligning objects, comprising:
    a conical disc having an upwardly-directed vertex and rotatable in a first direction at a first speed;
    a flat circular disc concentric with and underlying said conical disc, said flat circular disc having a periphery which projects beyond an edge of said conical disc, said flat circular disc being rotatable in said first direction at a second speed different from said first speed;
    a first arcuate wall bounding a sector of said conical disc and fixed in position;
    a second arcuate wall located adjacent to one end portion of said first arcuate wall and adjustable in a radial direction;
    a third arcuate wall extending from one end portion of said second arcuate wall, said third arcuate wall being flexible and adjustable in the radial direction, said third arcuate wall having a portion which lies at an adjustable distance from a portion of said first arcuate wall;
    a plurality of supports supporting said third arcuate wall; and
    a transmission system interconnecting said plurality of supports for adjusting said plurality of supports in synchronism to adjust a position of said third arcuate wall in the radial direction.

14. The apparatus for aligning objects as set forth in claim 13, wherein each of said supports comprises a radially movable rod, the end of which is engaged with said third arcuate wall.

15. The apparatus for aligning objects as set forth in claim 14, wherein a first one of said supports has its rod fixed in a hole in said third arcuate wall.

16. The apparatus for aligning objects as set forth in claim 15, wherein a second one of said supports has its rod slidable in a horizontal slot in said third arcuate wall.

17. The apparatus for aligning objects as set forth in claim 14, wherein each of said supports comprises a block having a through-hole through which said rod passes.

18. The apparatus for aligning objects as set forth in claim 17, wherein each of said supports includes a freely rotatable axially-locked toothed pulley which is internally threaded to receive a threaded portion of said rod.

19. The apparatus for aligning objects as set forth in claim 18, wherein each of said supports includes a toothed drive pulley, and a toothed belt rotatably connecting said toothed drive pulley to said axially-locked toothed pulley.

20. The apparatus for aligning objects as set forth in claim 19, wherein each of said toothed drive pulleys is driven by a mechanical transmission, and wherein said transmission system includes at least one drive belt interconnecting said mechanical transmissions together.

\* \* \* \* \*